United States Patent [19]

Cransac et al.

[11] Patent Number: 4,663,114
[45] Date of Patent: May 5, 1987

[54] APPARATUS FOR HANDLING NUCLEAR FUEL ASSEMBLIES AND ASSEMBLY ADAPTED TO SUCH AN APPARATUS

[75] Inventors: Jean-Pierre Cransac, Puyricard; Roland Jacquelin, Manosque; Charley Renaux, Jouques, all of France

[73] Assignees: Commissariat a l'Energie Atomique; Electricite de France Service National, both of Paris, France

[21] Appl. No.: 687,260

[22] Filed: Dec. 28, 1984

[30] Foreign Application Priority Data

Jan. 11, 1984 [FR] France ................. 84 00361

[51] Int. Cl.⁴ ................. G21C 19/20; G21C 19/10
[52] U.S. Cl. ................. 376/271; 294/906
[58] Field of Search ........... 376/271, 264, 261, 268; 294/906

[56] References Cited

U.S. PATENT DOCUMENTS

| | | | |
|---|---|---|---|
| 3,271,264 | 9/1966 | Fortescue et al. | 376/271 X |
| 3,421,635 | 1/1969 | Bunger | 376/271 |
| 3,600,277 | 8/1971 | Germer | 376/271 |
| 3,607,632 | 9/1971 | Hansen et al. | 376/264 X |
| 3,711,144 | 1/1973 | Briot | 376/264 X |
| 3,823,065 | 7/1974 | Jones | 376/271 |
| 3,990,591 | 11/1976 | Street et al. | 214/87 |
| 4,113,558 | 9/1978 | Wade | 376/271 |
| 4,311,557 | 1/1982 | Kowalski et al. | 376/271 |

FOREIGN PATENT DOCUMENTS

| | | |
|---|---|---|
| 1949245 | 4/1970 | Fed. Rep. of Germany . |
| 1395622 | 3/1965 | France . |
| 2019688 | 7/1970 | France . |
| 2373858 | 7/1978 | France . |
| 2395571 | 1/1979 | France . |
| 2413758 | 7/1979 | France . |
| 0068392 | 6/1978 | Japan ................. 376/271 |

OTHER PUBLICATIONS

"Retrieval of Damaged Subassembly from Experimental Breeder Reactor II Primary Tank", Nuc. Tech., 1/81, King et al, pp. 32-42.

Primary Examiner—Deborah L. Kyle
Assistant Examiner—Dan Wasil

[57] ABSTRACT

The invention relates to an apparatus for handling nuclear fuel assemblies, as well as to an assembly for use with such an apparatus.

The apparatus comprises a vertically axed guide tube in which is displaced a grapnel, suspended on a flexible connection such as a chain, under the action of a reduction gear. As the grapnel is immobilized in rotation in the guide tube, an assembly is gripped by means of a bayonet system by controlling the rotation of the guide tube-grapnel assembly by a reduction gear. The apparatus can in particular be suspended on the small and/or large rotary plug of a fast neutron nuclear reactor. It can also be used in a handling hod under gas.

11 Claims, 10 Drawing Figures

APPARATUS FOR HANDLING NUCLEAR FUEL ASSEMBLIES AND ASSEMBLY ADAPTED TO SUCH AN APPARATUS

BACKGROUND OF THE INVENTION

The present invention relates to an apparatus for handling nuclear fuel assemblies, particularly in a fast neutron nuclear reactor and to an assembly for use with such an apparatus.

The assemblies constituting the core of a fast neutron nuclear reactor conventionally comprise elongated boxes or cases containing a bundle of sheathed rods containing the fissile or fertile material. For simplification reasons, throughout the present application, these two types of assembly are referred to as "nuclear fuel assemblies".

In order to permit the handling thereof in the actual reactor, in storage cells attached thereto, or even during transportation or subsequent handling of these assemblies, the boxes have at their upper end a gripping head permitting the raising and transfer of each assembly with the aid of an appropriate handling apparatus.

With respect to the actual reactor, it generally comprises a vertically axed vessel sealed by a horizontal slab at its upper end and filled with a liquid cooling metal such as sodium, surmounted by a layer of a neutral gas such as argon. The vessel also contains the reactor core constituted by a group of a certain number of nuclear fuel assemblies arranged in accordance with a hexagonal network or lattice. Each assembly has a leg, which engages in a supporting member resting on the bottom of the vessel. The loading and unloading of the assemblies generally take place by means of a handling container moving within a ramp linking the interior of the vessel with an external chamber generally positioned above the slab.

In existing fast neutron reactors, such as Phénix or Super-Phénix reactors, the handling of the fuels between the core and the handling container is carried out by means of a handling poker and/or a handling arm suspended on rotary plugs disposed in the slab above the reactor core and whose axes are displaced in such a way that the combined rotation of these plugs makes it possible to have access to all the assemblies constituting the core.

These pokers or arms are equipped with handling means incorporating articulated gripping jaws or claws, whose opening and closing are controlled by a rigid rod passing through the slab. When an assembly is extracted from the core or has to be introduced into the latter, the control rod rises above the slab by a height corresponding to the interior of a tight enclosure provided for this purpose above the slab. For example, that part of the assembly handling means above the slab has a height of 7 meters in the Phénix reactor and 14 meters in the Super-Phénix reactor.

The above description clearly shows that the presently used handling means have considerable overall dimensions and consequently a high cost. Moreover, the need for a perfect sealing when they pass through the slab makes the maintenance and emergency repair operations relatively complex.

Moreover, the available space for the poker in the small rotary plug is not very great, bearing in mind that the latter is traversed by the mechanisms ensuring the control of the control rods used for controlling and stopping the reactor. Thus, the overall diameter of the poker must be as small as possible.

The design of the handling means must also take account of a certain number of constraints due to the modification of the structure of the assemblies resulting from their irradiation in the core. Thus, this irradiation leads to a displacement of the network or lattice formed by the assemblies. In the same way, the irradiated assemblies are frequently curved and have a certain elongation. Moreover, the handling means must make it possible to orient the assembly by ±180°.

Finally and independently of all the constraints referred to hereinbefore, the assembly handling means must have an absolute security of gripping, in order that in no case the assembly can be dropped during handling.

SUMMARY OF THE INVENTION

The present invention relates to a handling apparatus not suffering from the disadvantages of the prior art apparatuses and which satisfies all the requirements referred to hereinbefore. In particular, it makes it possible to realise in a more economic manner than was possible in the prior art the installation for handling assemblies within a fast neutron nuclear reactor, described in French patent application No. 8,017,961, filed by the C.E.A. on 14.8.1980. Moreover, although the apparatus according to the invention is particularly intended for handling assemblies within the vessel of a fast neutron reactor, it is obviously not limited to this preferred application and can also be used for any other handling operation of assemblies outside the reactor vessel.

The present invention therefore proposes an apparatus for handling nuclear fuel assemblies, wherein it comprises a substantially vertically axed guide tube, a grapnel mobile in translation within the guide tube and integral in rotation therewith, said grapnel being able to grasp an assembly under the action of a rotation about the axis of the guide tube, lifting means for displacing the grapnel within the guide tube via a flexible connecting means and gripping means controlling the rotation of the guide tube - grapnel assembly.

In order to ensure that there is no risk of assemblies being dropped during handling, the guide tube has means for guiding the assembly preventing the rotation thereof within the guide tube.

According to a first constructional variant of the invention, these guidance means are located at a level such that they only act on the assembly when the latter is disengaged from a network, e.g. formed by the reactor core, in which it is normally immobilized in rotation. The guide tube is then directly mounted in rotary manner on a support member.

According to a second constructional variant of the invention, the guidance means are located at a level such that they act on the assembly when the latter is still engaged in the network in which it is normally immobilized in rotation. In this case, in order to take account of the deformation of assemblies after irradiation, the guide tube is then mounted in rotary manner on a support member via connecting means permitting a swinging movement.

In a preferred embodiment of the invention, which also makes it possible to take account of deformations of irradiated assemblies, the grapnel incorporates a carriage guided by at least one guide rail within the guide tube, a gripping nose provided with means for grasping an assembly under the effect of a rotation of the grapnel about the axis of the guide tube and means for supporting the gripping nose by the carriage authorizing a swining movement of the gripping nose with respect to the carriage.

The invention also relates to an assembly for use with a handling apparatus of the present type, said assembly comprising an assembly head, a flange provided with notches being formed at the upper end of an axial passage issuing at the upper end of the assembly head.

In the application of the apparatus according to the invention, to the handling of assemblies within the vessel of a fast neutron nuclear reactor containing the reactor core, said vessel being sealed by a slab and plugs supporting said apparatus, the lifting means and the gripping means are placed in a recess in the thickness of one of said plugs in accordance with the axis of the guide tube and sealed by a tight cover. In this way, a poker is formed, which is preferably supported by the small rotary plug.

In this application, the guide tube can be supported in rotary manner by a square-shaped rigid structure suspended on the slab via means for orienting said structure about a second vertical axis displaced with respect to the axis of the guide tube, the lifting means, the gripping means and the orientation means being positioned just above a recess located in the thickness of one of the plugs, in accordance with the second vertical axis, within a tight cover sealing said recess. In this way, a gripping arm is formed, which can be suspended on one of the rotary plugs.

Obviously, the two embodiments of the apparatus according to the invention described hereinbefore with reference to the application of said apparatus to the handling of assemblies within the reactor vessel can be used jointly, e.g. for transferring assemblies in accordance with the method described in the aforementioned patent specification.

In another embodiment of the invention applied to the handling of assemblies between at least two stations overhung by a slab having at least one passage to the right of each station, the guide tube is located in a hod, which can move on the slab in such a way that it is successively positioned above each opening, the guide tube being mobile in translation within the hod between an upper transportation position and a lower gripping position, said gripping means engaging with the guide tube only when the latter is in the lower position.

In this case, the guide tube preferably has at its upper end at least one row of outer runners bearing on one of the two series of guide rails within the hod, the gripping means controlling the rotation of a cylinder placed at the lower end of the hod and having on its inner face a series of guide rails on which bear the said outer runners when the guide tube is in the lower position.

The apparatus according to the invention can then comprise means for alternatively fixing the grapnel to the guide tube when the latter is not in the lower position and for fixing the guide tube to the cylinder when the guide tube is in the lower position.

BRIEF DESCRIPTION OF THE DRAWINGS

The present invention is described in greater detail hereinafter relative to two non-limitative embodiments and with reference to the attached drawings, wherein show.

DETAILED DESCRIPTION OF THE PREFERRED EMBODIMENTS

Figure 1:
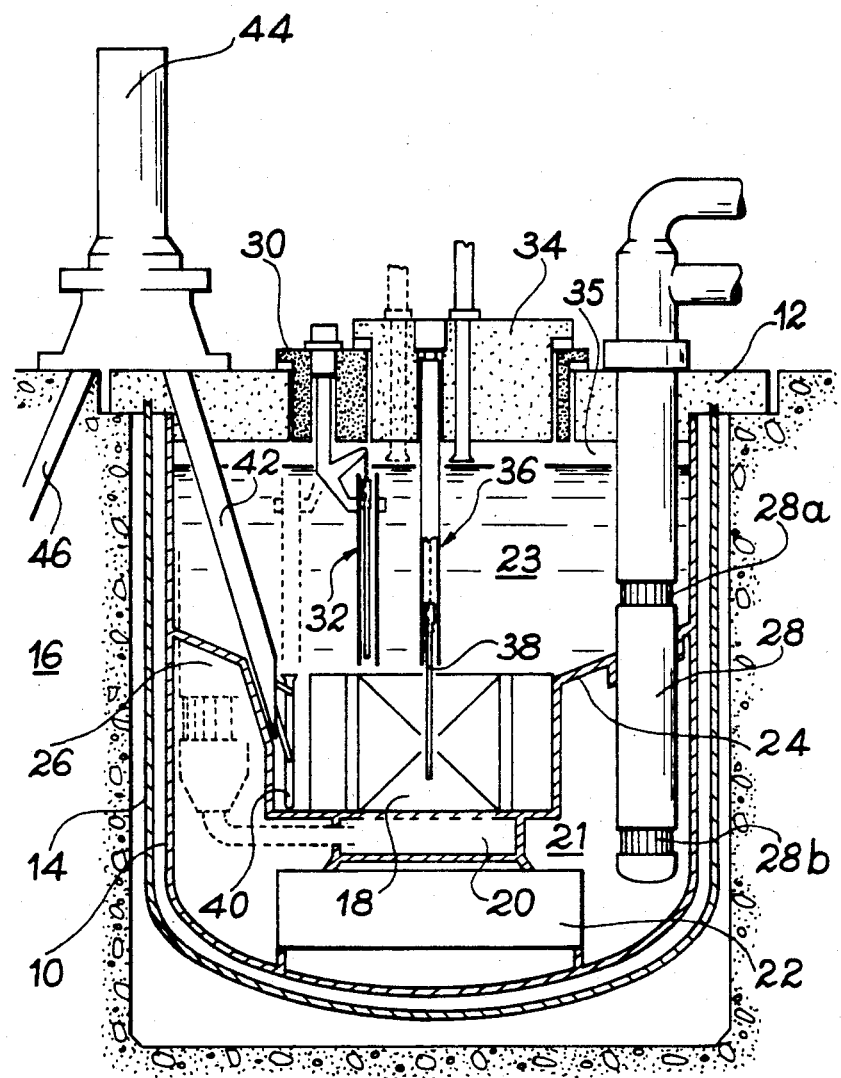
FIG. 1 a vertical sectional view diagrammatically showing a fast neutron nuclear reactor equipped with a poker and a handling arm according to the invention.

In known manner, the fast neutron nuclear reactor of FIG. 1 comprises a vertically axed main vessel 10 sealed at its upper end by a closing slab 12, on which is generally suspended the main vessel 10, as well as a safety vessel 14 duplicating the latter. The peripheral edge of slab 12 rests on a concrete enclosure 16 defining a vessel well in which are located vessels 10 and 14.

Within the main vessel 10 is located the reactor core 18, which rests on the bottom of vessel 10 via a support structure comprising a supply member 20 and a flooring 22. Vessel 10 is filled over most of its height by liquid metal, generally constituted by sodium and is surmounted by a covering 35 of a neutral gas, such as argon. In addition, the main vessel 10 is subdivided in the heightwise direction into a lower cold zone 21 and an upper hot zone 23 by an inner vessel 24.

Liquid metal is circulated within vessel 10 by means of a certain number of primary pumps 26, which suck the relatively cold liquid metal contained in the lower zone 21 in order to deliver the same to the supply member 20, so as to circulate it from bottom to top in reactor core 18. The thus heated liquid metal then enters the upper zone 23 and by means of inlets 28a enters heat exchangers 28. Within said exchangers, the hot liquid metal transfers its heat to a secondary fluid, generally constituted by a liquid metal such as sodium. The thus cooled liquid metal passes out of exchangers 28 by outlets 28b issuing into zone 21, before being taken up again by pumps 26 to be injected into the supply member 20 of reactor core 18.

FIG. 1 shows how the apparatus according to the invention can permit the realisation of the handling installation described in French patent application No. 8,017,961, filed on Aug. 14th 1980 by the Commissariat à l/Energie Atomique. Thus, a larger rotary plug 30 located in an opening formed in slab 12 above reactor core 18, supports a handling arm 32 and a small rotary plug 34 located in an opening formed in plug 30 and whose axis is displaced with respect to the rotation axis of the latter, supports a handling poker 36. As was stated in the aforementioned patent specification, combined rotations of plugs 30 and 34, with the aid of poker 36 and arm 32, make it possible to transport in one or two steps a random assembly 38 of reactor core 18 up to a handling container 40 positioned on the periphery of core 18 and vice versa.

FIG. 1 also shows part of the apparatus for handling the assemblies which makes it possible to transfer them from within the vessel 10 to a not shown, auxiliary cell. This visible part of the handling installation comprises a first sloping ramp 42, by which the container 40 can be transferred from the periphery of core 18, into a pivoting hod 44 located above slab 12. After being placed in container 40 with the aid of handling arm 32, the assembly to be discharged is thus transported in ramp 42 up to hod 44. A second sloping ramp 46, which also issues into hod 44, is linked with a not shown, auxiliary cell, into which the assembly can be discharged in this way. Obviously, the reverse handling operation permits the loading of the reactor.

According to the state of the art, the handling means such as poker 36 and handling arm 32 grip heads of the assemblies with the aid of articulated jaws, whose opening and closing are controlled by a rigid rod, which is extended above the slab into tight enclosures having a height which significantly exceeds that of an assembly.

According to the invention, the parts of the handling means located above the slab are virtually eliminated and the risk of an assembly dropping during handling is substantially zero.

Figure 2:
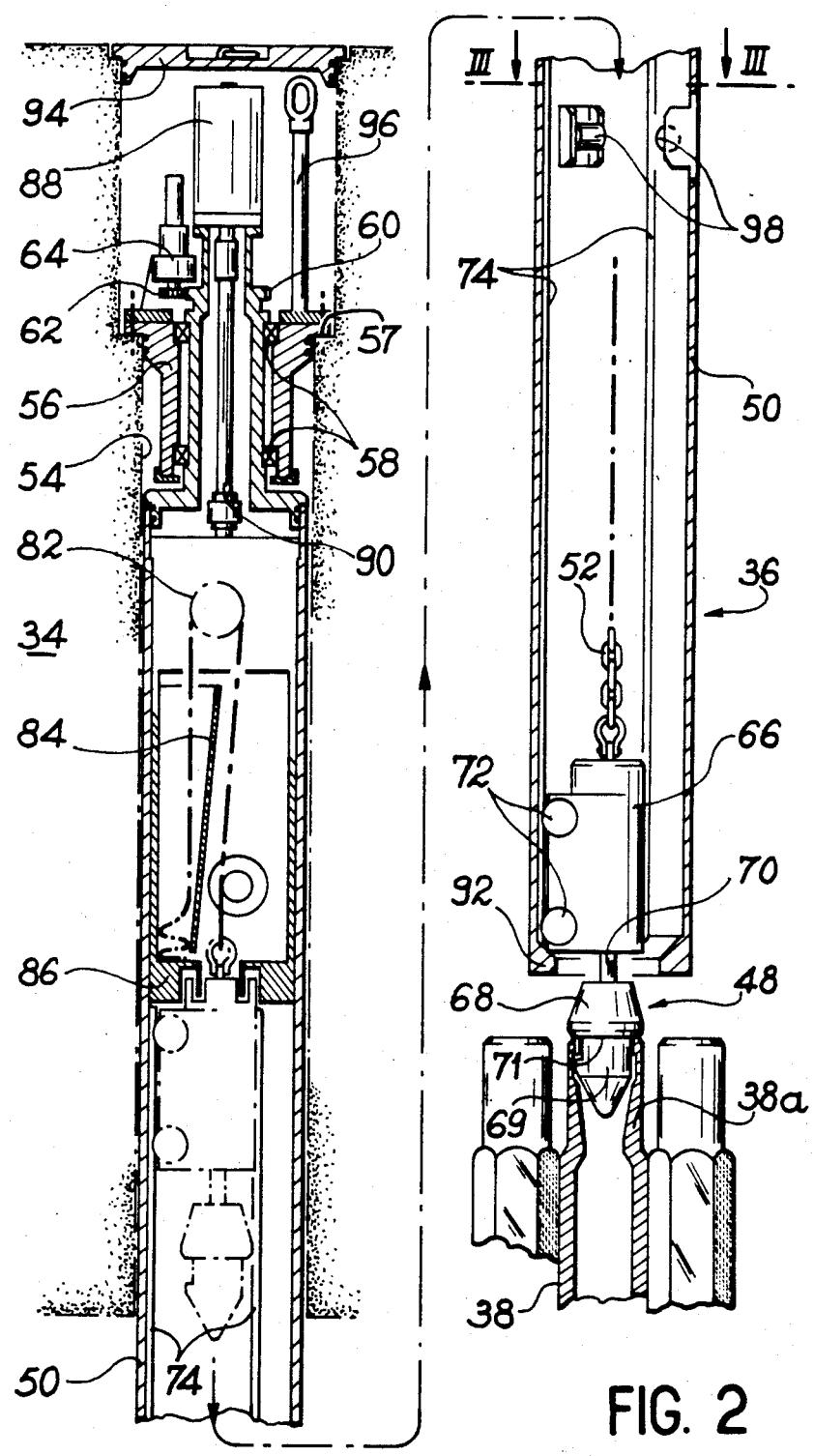
FIG. 2 a larger scale longitudinal sectional view, whereof the left and right-hand parts respectively represent the top and bottom of the poker equipping the reactor of FIG. 1.

As is illustrated by FIG. 2 in the case of poker 36, this result is obtained by effecting the gripping of the assembly head by a rotary movement, which is transmitted to grapnel 48 by means of a guide tube 50, which is immobilized in translation relative to slab 12, or more specifically to plug 34 which supports it and as a result of the fact that the displacement of grapnel 48 within guide tube 50 is controlled by means of a flexible link, such as a chain 52.

More specifically, FIG. 2 shows that the plug 34 is completely traversed by a cylindrical passage 54, whose vertical axis coincides with that of guide tube 50. The reduced diameter upper end of guide tube 50 is supported in rotary manner in passage 54 by means of a sleeve 56, fixed to a shoulder 57 formed in said passage, as well as by bearings 58. Above sleeve 56, guide tube 50 has a spur wheel 60 on which engages a pinion 62, whose rotation is controlled by a reduction gear 64 fixed to sleeve 56. As will be shown hereinafter, reduction gear 64 is used for controlling the gripping of head 38a of an assembly 38 by a poker 36.

FIG. 2 also shows that the grapnel 48 comprises a carriage 66 ensuring the guidance of the grapnel within the guide tube 50, whilst preventing the rotation thereof, as well as a gripping nose 68 and a swinging connection 70, by which nose 68 is suspended on carriage 66.

As is illustrated by FIGS. 2 to 6, the carriage 66 has two sets of three runners 72, which are arranged at 120° from one another. Each of the runners has a V-shaped groove rolling on a rail 74 having a semicircular section (FIG. 3) which extends vertically within the guide tube 50 over the entire height thereof. The cooperation of the two sets of three runners 72 with the three rails 74, thus makes it possible to ensure the vertical guidance of the carriage 66 and prevent the rotation thereof within the guide tube.

The swinging connection 70 by which the nose 68 of the grapnel is suspended on carriage 66 comprises a rod articulated respectively on the nose and on the carriage by means of two not shown, known universal joint systems. Thus, nose 68 is integral in rotation with carriage 66, but can move laterally and assume a certain angular orientation relative to the carriage 66 about two orthogonal axes. Thus, the grapnel nose can be locked on the head of the assembly, even when the latter has a certain deformation after irradiation.

Figure 4:
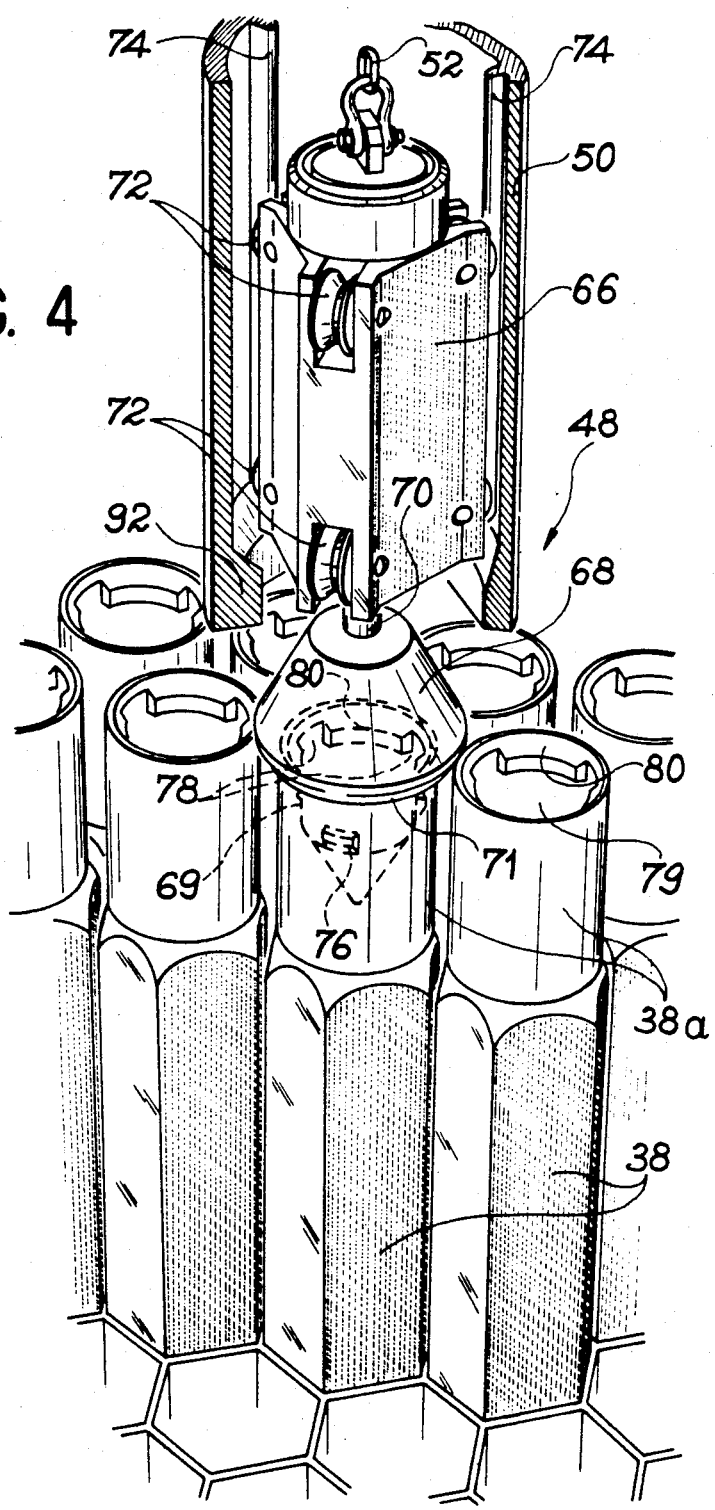
FIG. 4 an exploded perspective view showing the lower end of the poker of FIG. 2, when the nose of the poker grapnel is introduced into the head of one of the assemblies of the reactor core.

In order to bring about the gripping of an assembly 38 by a rotation of grapnel nose 68, use is made of a so-called bayonet system. As can be seen in FIG. 4, head 38a of each of the assemblies has at the upper end of the central passage 79, which normally ensures the flow of liquid metal to the upper zone 23 of the reactor vessel, a flange 80, which is e.g. provided with three notches 78 arranged at 120° from one another.

In a comparable manner, at its lower end, the grapnel nose 68 has a substantially cylindrical portion 69, which can be introduced into flange 80. In order to facilitate its introduction into the assembly head, said portion 69 is preferably extended by a lower conical portion. At its lower end, the cylindrical portion 79 has gripping lugs 76, which pass through the notches 78 when the grapnel nose is introduced into an assembly. Above portion 69, the grapnel nose 68 has a shoulder 71, which abuts against the upper face of the assembly when portion 69 is introduced into the assembly head.

As a result of these characteristics, it is obvious that when nose portion 69 is introduced into the head 38a of an assembly, the orientation of the nose then being such that the lugs 76 face the notches 78, a rotation of nose 68 makes it possible to engage lugs 76 with flange 80. In the represented variant, in which the assembly head and the grapnel nose respectively have three notches 78 and three gripping lugs 76, this rotation is approximately 60°.

Taking account of the characteristics described hereinbefore, it is clear that the gripping of an assembly can be brought about by acting on the reduction gear 64, which controls the rotation of guide tube 50 and, via carriage 66 and connection 70, nose 68 of grapnel 48.

In order to displace carriage 66 within guide tube 36 for bringing about the raising and lowering of the assembly to be manipulated, it has already been stated that the grapnel 48 is displaced by means of a flexible connection, such as a chain 52. More specifically, the lower end of chain 52 is fixed to carriage 66, the chain being driven by means of an indented wheel 82, whose shaft is supported by guide tube 50, just below sleeve 56. The other portion of the chain 52 generally called the slack portion, is received in a cable or chain locker 84. The bottom of locker 84 is constituted by a portion of an abutment 86 defining the upper position of the grapnel, as is shown in mixed line form in FIG. 2. The grapnel is in this position when the reactor is operating. The upper portion of carriage 66 is then located in abutment 86 in order to bring about a seal against sodium vapours.

The rotation control of the indented wheel 82 is brought about by a second reduction gear 88, mounted on the upper end of guide tube 50 and whose vertical output shaft 90 drives the shaft carrying the wheel via not shown bevel pinions or any equivalent transmission system.

By means of chain 52, reduction gear 88 is able to ensure the raising and lowering of grapnel 48 between the upper position shown in mixed line form and the lower position shown in continuous line form in FIG. 2. A flange or collar 92 formed at the lower end of guide tube 50 serves as an abutment for carriage 66 in said lower position.

As illustrated by FIG. 2, the reduction gears 64, 88 control the poker 36 and are completely located within the passage 54 formed in plug 34, in the same way as the vessel wall 84 and the grapnel 48 when it is in the upper position. Thus, the sealing of the plug passage can easily be brought about by means of a cover 94, which seals the upper end of passage 54 and whose removal, if necessary, makes it possible to carry out maintenance on the grapnel, which can be optionally removed from the reactor, e.g. using a gripping system such as 96 joined to sleeve 56.

Figure 3:
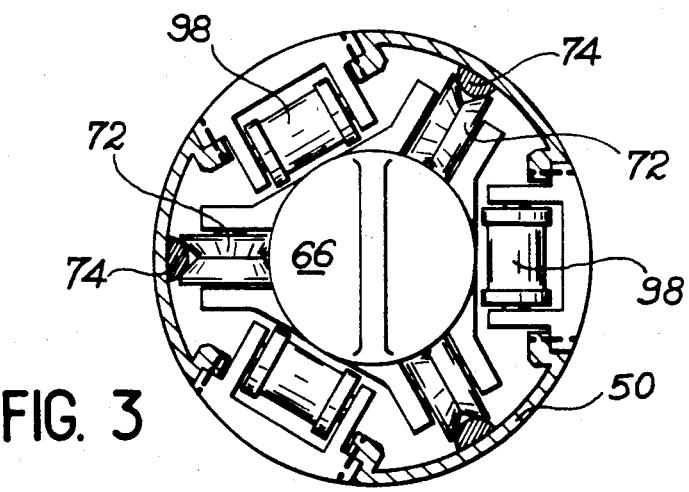
FIG. 3 a larger scale sectional view along line III—III of FIG. 2.
Figure 5:
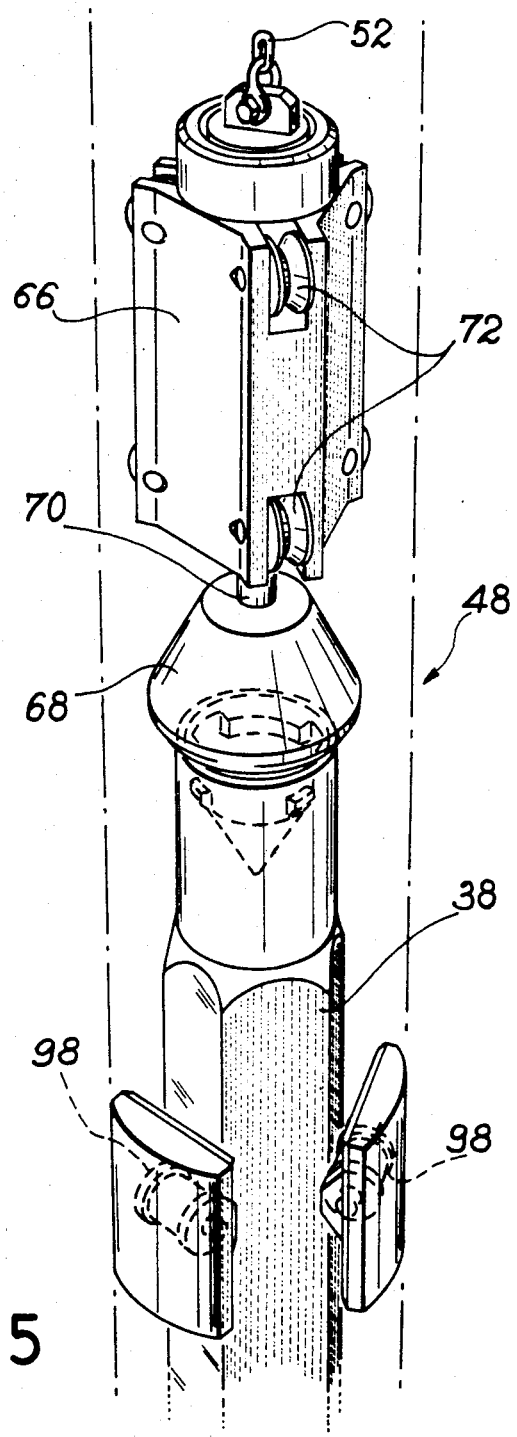
FIG. 5 a perspective view comparable to FIG. 4 showing the guidance of an assembly suspended on the grapnel within the poker guide tube, the latter being sketched in mixed line form to facilitate the understanding of the drawing.

In order to prevent an accidental unlocking of the assembly relative to the gripping nose 68, FIGS. 3 and 5 show that within the guide tube 50 there is at least one row of three rollers 98 designed to bear against the three non-adjacent faces of the hexagonal box of the manipulated assembly 38.

In view of the fact that the assembly 38 cannot rotate relative to grapnel 48 when it remains engaged in the lattice formed by the reactor core, rollers 98 can be located at a height such that they only intervene beyond said limit. Thus, in this case, the sleeve 56 by which the guide tube 50 is suspended on plug 34 can be directly fixed thereto. Thus, a possible deformation of the assembly is then completely taken into account by the swinging connection 70.

However, if the rollers 98 are positioned sufficiently low within tube 50 to bear on the faces of the assembly before the latter has left the lattice formed in the core by the other assemblies, it is necessary to take account of a possible deformation of the assemblies resulting from their irradiation. For this reason, the sleeve 56 is then preferably fixed to plug 34 by means of a universal joint-type device or a flexible device enabling the tube to perform a swinging movement relative to the plug. Such a device is known and will not be described here. It is preferably positioned between sleeve 56 and plug 34.

Figure 7:
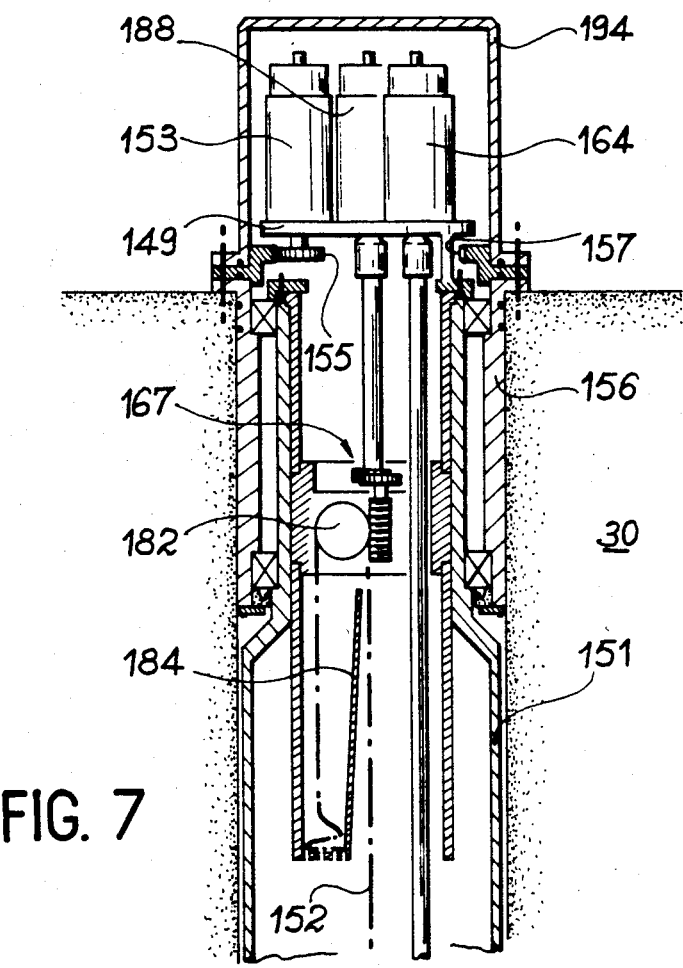
FIG. 7 a larger scale longitudinal sectional view of the upper part of the arm shown in FIG. 6.
Figure 6:
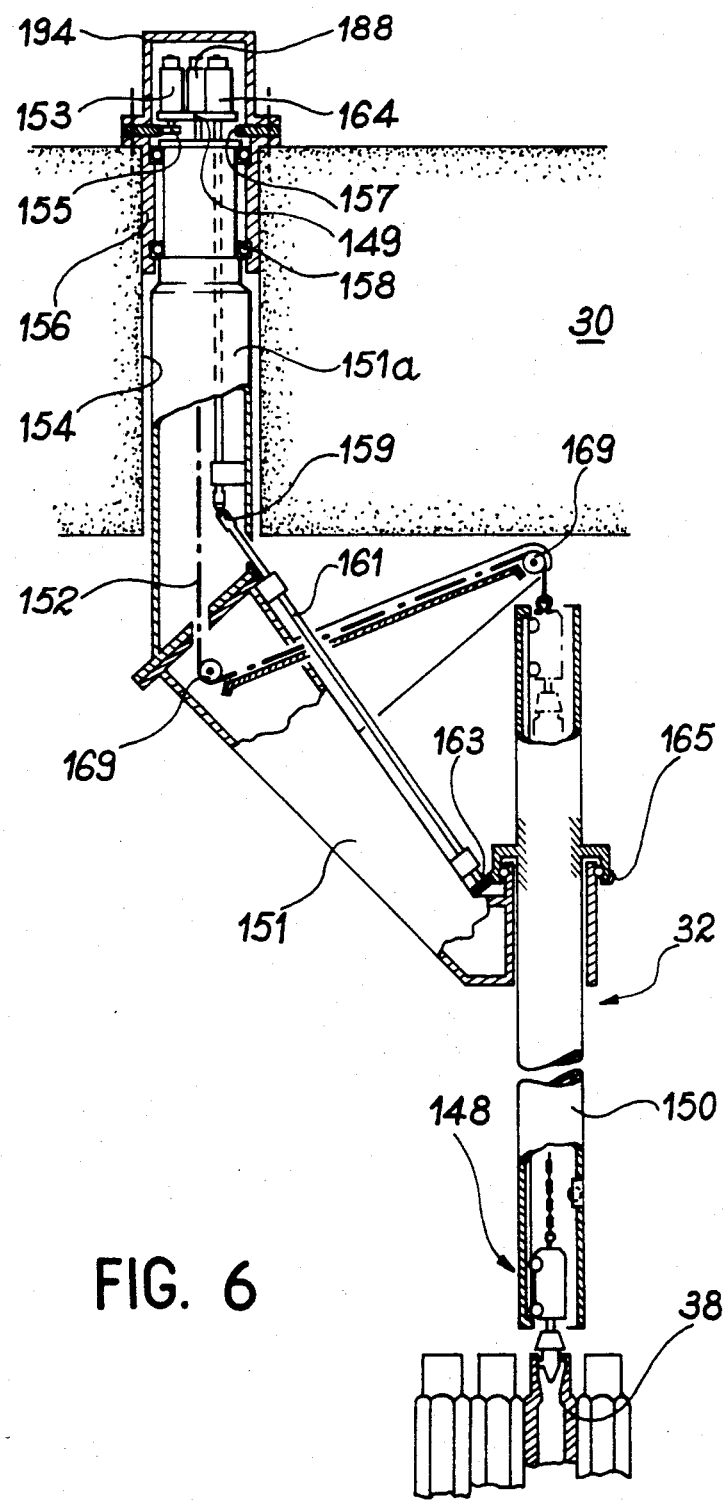
FIG. 6 a partial longitudinal sectional view of the handling arm used in the reactor of FIG. 1.

As illustrated in FIGS. 6 and 7, the handling apparatus described hereinbefore in the case of a poker 36 with reference to FIGS. 2 to 5, can also be used for realising a handling arm 32, which is e.g. usable in the reactor of FIG. 1.

Thus, FIG. 6 shows a vertically axed guide tube 150, within which moves a grapnel 148 comparable to the previously described grapnel 48. The guide tube 150 is supported in rotary manner by a square-shaped rigid structure 151, which rotates in the reactor slab 12 or more specifically in the large rotary plug 30. To this end, the rigid structure 150 has a substantially tubular portion 151a, located in a vertically axed passage 154 formed in plug 30 and displaced with respect to the axis of guide tube 150. This portion of structure 151 is supported in rotary manner by means of bearings 158 in a sleeve 156 fixed in passage 154.

It can be seen that from FIG. 7 the tubular part of structure 151 carries at its upper end a plate 141, on which is received a first reduction gear 153, whose vertical shaft drives a pinion 155, which engages in a spur wheel 157 integral with fixed sleeve 156 and whose axis coincides with the vertical axis of portion 151a. Thus, through the construction of reduction gear 153, it is possible to rotate arm 32 about the vertical axis of passage 154.

Plate 149 also supports a second reduction gear 164 controlling the rotation of guide tube 150 about its own vertical axis, i.e. the gripping of the assembly by grapnel 148, as well as a third reduction gear 188 controlling the rise and fall of grapnel 148 in the guide tube via a flexible connection, such as a chain 152.

FIG. 6 more specifically shows that the vertical shaft of reduction gear 164 rotates, e.g. via a homokinetic joint 159, a sloping shaft 161 supported in rotary manner by support 151 and whose lower end carries a pinion 163, which engages on a spur wheel 165 integral with guide tube 150.

In a comparable manner and as illustrated in FIGS. 6 and 7, the vertical output shaft of reduction gear 188 drives, via pinions 167, a horizontally axed indented wheel 182, which receives the chain 152. One of the ends of chain 152 is fixed, as hereinbefore, to grapnel 148. Chain 152 then passes on smooth caster wheels 169 supported by support 151, before being driven by the indented wheel 182. As hereinbefore, a chain locker 184 makes it possible to retrieve the slack portion of chain 152.

As is more particularly shown in FIG. 7, the plate 149, together with the reduction gears 153, 164 and 188 supported by it are located just above the upper face of plug 30. Thus, the passage through the slab can easily be sealed by placing said reduction gears in a cover 194 fixed to the upper face of plug 30. Another possibility consists of integrating the reduction gears into the slab.

Obviously, the invention is not limited to the embodiment described hereinbefore with reference to FIGS. 2 to 7 and in fact covers all variants thereof. Thus, the chain used for controlling the rise or fall of the grapnel within the guide tube can be replaced by any other equivalent flexible connection, such as a cable. In the same way, the grapnel can be guided within the guide tube by any other known means making it possible to simultaneously transmit to the grapnel any rotary movement of the guide tube.

Furthermore, although the invention is particularly adapted to the construction of a poker and a handling arm for use within the vessel of a fast neutron nuclear reactor, the apparatus according to the invention can also be used in other applications and particularly for ensuring the handling of nuclear fuel assemblies within a storage or transfer enclosure for the said fuel.

Figure 8:
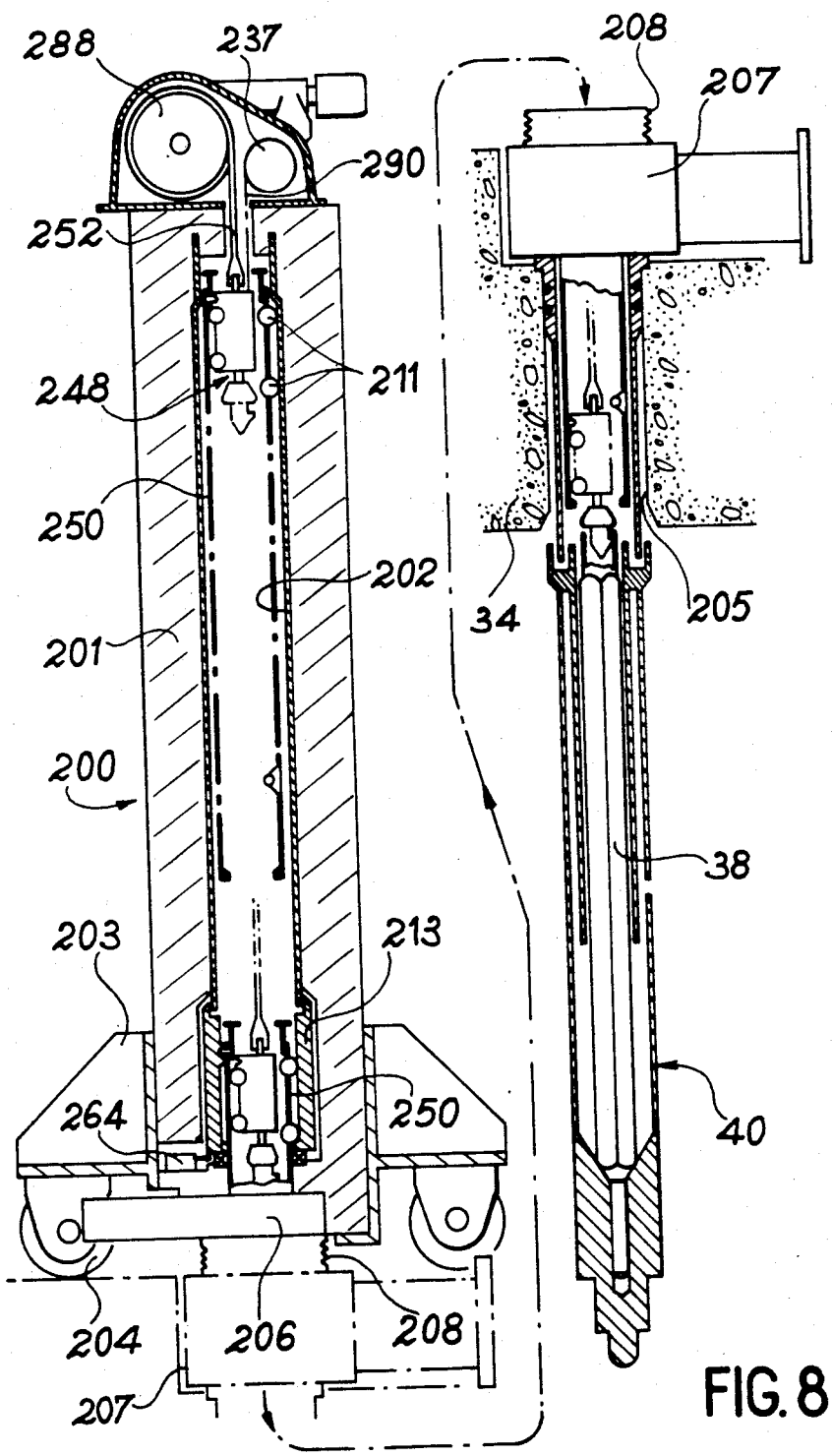
FIG. 8 a longitudinal sectional view comparable to FIG. 2, whereof the left and right-hand parts respectively represent the top and bottom of a handling hod between the reactor and a conditioning station, said hod being constructed according to the invention.
Figure 9:
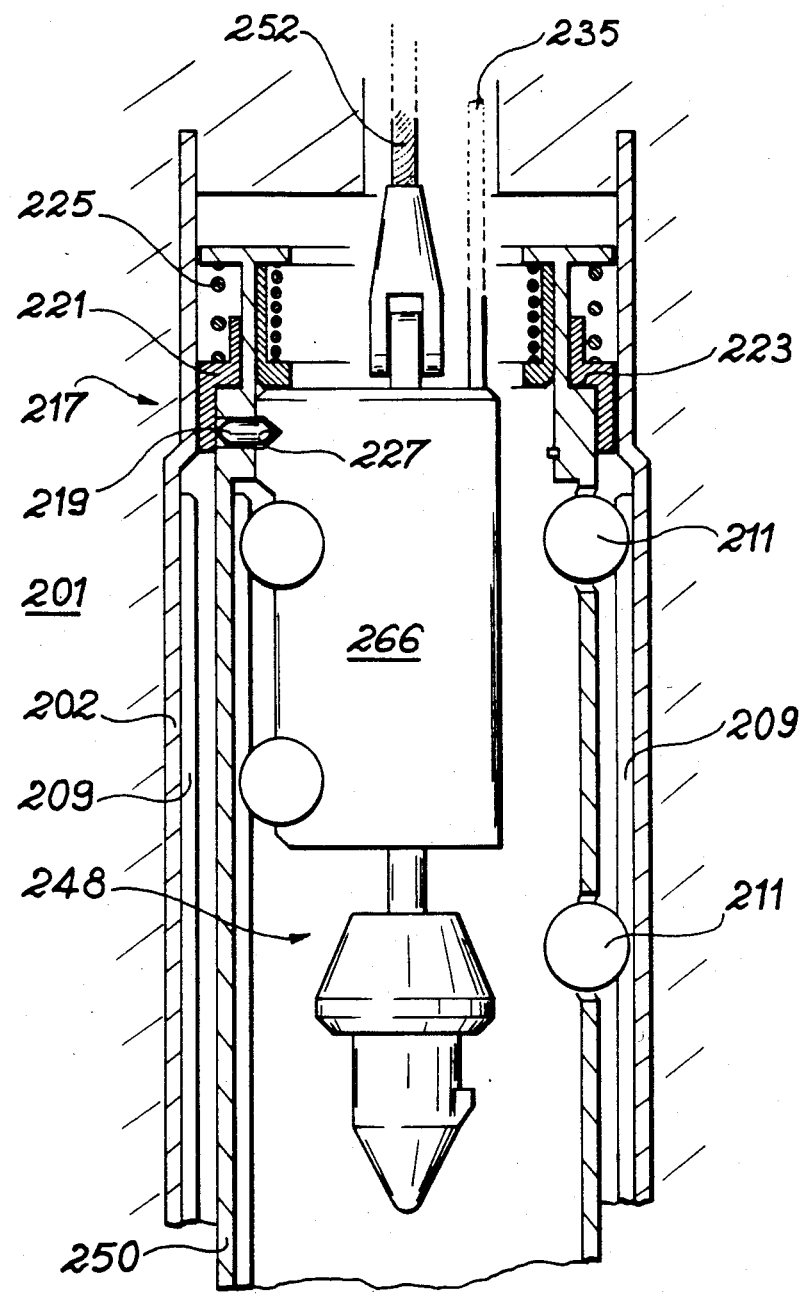
FIG. 9 in larger scale form, the upper part of the hod of FIG. 8, when the grapnel and the guide tube are in the upper position.
Figure 10:
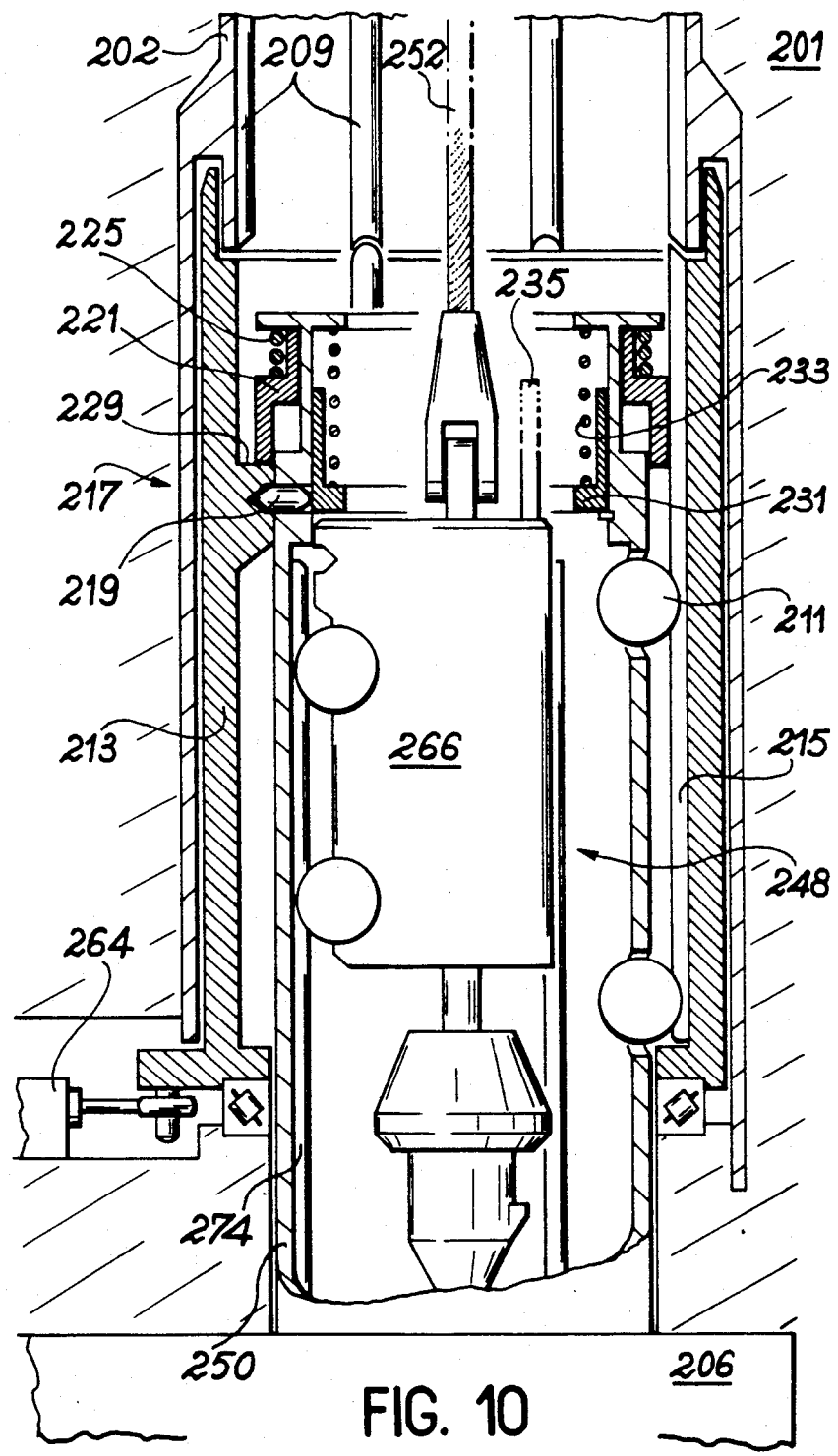
FIG. 10 on the same scale as FIG. 8, the lower part of the hod when the guide tube is in the lower position, the grapnel remaining in the upper position within the guide tube.

Thus, the apparatus according to the invention can be adapted to a hod for handling spent assemblies between the reactor and a conditioning station, as illustrated in FIGS. 8 to 10.

The handling hod 200 shown in FIG. 8 can in particular replace the traditional handling hod 44. It comprises an e.g. cast iron body 201, provided with an internal cavity sheathed by a stainless steel tube 202, which brings about the seal α. Body 201 rests on a chassis 203 equipped with wheels 204 permitting movement thereof, via not shown rails, on the slab 12 sealing the reactor vessel, between a vertical passage 205 formed in the slab above ramp 42 (FIG. 1) and a not shown passage overhanging a not shown conditioning station. A valve αβ 206 seals the bottom of the cavity formed in body 201 during the transportation of an assembly. Simultaneously, passage 205 is sealed by a valve αβ 207. The connection between the hod 200 and the reactor is brought about by means of a bellows 208 prior to the opening of valves 206 and 207. When it passes below passage 205, the irradiated assembly 38 is located in the then vertically positioned handling container 40.

According to the invention, a handling apparatus having a guide tube 250 and a grapnel 248 is located in hod 200 during transportation, as is shown at the top and to the left in FIG. 8. Grapnel 248 is identical to the grapnel 48 described with reference to FIGS. 2 to 5. Grapnel 248 is suspended on a cable 252 or any similar device wound onto a winch 288 fixed to the top of body 201 of the hod. As will be shown hereinafter, winch 288 is also responsible for raising the guide tube 250, which differs from the previously described guide tubes 50 and 150 by the fact that it is vertically movable within the sheathing tube 202.

In order to permit this vertical displacement of guide tube 250 within tube 202, the latter has two series of three rails 209 (FIG. 9), which are arranged at 120° from one another, the rails of the two series being displaced by 60° to take account of the 60° rotation of the guide tube during the gripping of an assembly 38 by grapnel 248. At its upper end, guide tube 250 has three pairs of external guide runners 211, which are displaced by 180° and which bear on one or other of the series of rails 209, depending on whether or not an assembly is attached to the grapnel.

At chassis 203, tube 202 is widened, so as to house a rotary cylinder 213, whose 60° rotation in one or other direction is controlled by a jack 264. The inner face of the rotary cylinder 213 carries three rails 215 (FIG. 10), which are arranged at 120° from one another and extend one or other of the series of rails 209 of tube 202, as a function of the position occupied by cylinder 213. As can be seen in the left-hand bottom part of FIG. 8 and on a larger scale in FIG. 10, when guide tube 250 is in the lower position, its three pairs of runners 211 are located on rails 215. The effect of the rotation of cylinder 213 is then to rotate the guide tube 250 and consequently the grapnel 248, thus controlling the gripping of an assembly when the latter is in the lower position, as can be seen in the right-hand part of FIG. 8.

A locking device 217 is provided to ensure that guide tube 250 is integral with grapnel 248 during the first part of the lowering thereof and then integral with cylinder 213, in order that the grapnel can continue to be lowered to the lower end of the guide tube.

Device 217, shown in greater detail in FIGS. 9 and 10, has at least one stud 219 radially located in a hole formed in the upper part of guide tube 250. The exterior of the hole is normally sealed by a sleeve 221, which surrounds the upper part of the guide tube and which is drawn downwards against a shoulder 223 by a spring 225. Under these conditions, stud 219 projects out of the hole formed in the guide tube into a slot 227 formed for this purpose in grapnel body 226. The grapnel is then integral with guide tube 250.

As can be seen in FIG. 10, when the assembly constituted by guide tube 250 and grapnel 248 reaches the rotary cylinder 213, sleeve 221 bears on a shoulder 229 formed on the cylinder. The latter then disappears upwards in opposition to spring 225, which enables the outer end of stud 219 to be placed in a slot 235 formed in cylinder 213.

A second sleeve 231 placed within the guide tube 250 bears on the upper face of body 266 of grapnel 248 under the action of a spring 233. As soon as the outer end of the rounded-end stud 219 faces slot 235, stud 219 is forced into said slot under the action of spring 233 and grapnel 248 starts to drop within the guide tube 250, which for this purpose has guide rails 274, as in the previous embodiments. These guide rails also serve to transmit to the grapnel the rotary movement of the guide tube controlled by jack 264.

The handling hod 200 shown in FIGS. 8 to 10 also has a circuit for cooling the assemblies by the blowing of a neutral gas, such as argon, into the assembly contained in the hod. This blowing is brought about by means of a not shown closed circuit, which mainly comprises a sodium vapour filter, a heat exchanger and a compressor, which are duplicated for safety reasons. Parallel to the hoisting cable 252, a flexible tube 290 (FIG. 8) supplies the cooling gas to grapnel 248. An automatic winding drum 247 is used for retrieving the flexible tube 235, which is fixed to the grapnel body and extended with the grapnel by a hole issuing into the head of the assembly by an orifice formed in the grapnel nose.

Obviously, the constructional variant described hereinbefore with respect to the handling hod and FIGS. 8 to 10 can also be applied to other handling machines, without passing outside the scope of the invention.

Finally, in the application of the invention to a fast neutron nuclear reactor, it is obvious that the invention can be used in all reactors of this type. In particular, although FIG. 1 shows a so-called integrated reactor, in which the pumps and exchangers are located in the reactor vessel, the handling means described hereinbefore could also be used in a so-called loop reactor, in which the exchangers and optionally the pumps are located outside the vessel.

What is claimed is:

1. An apparatus for handling a nuclear fuel assembly, said apparatus comprising:
   support means;
   a rotatable guide tube carried by said support means, said guide tube having a vertical axis and being provided with at least one internal vertical guide rail;
   a carriage guided for vertical movement within said guide tube along said guide rail, while being integral in rotation with the guide tube;
   a gripping nose supported by said carriage in such a manner that said nose is integral in rotation with the carriage and capable of a swinging movement relative to the carriage, said gripping nose being provided with means for grasping a fuel assembly under the effect of a rotation of said gripping nose about said vertical axis;
   flexible lifting means for displacing the carriage along said guide rail; and
   means for rotating said guide tube relative to said support means, and thus the carriage and the gripping nose, about said vertical axis, in order to actuate said means for grasping a fuel assembly.

2. An apparatus according to claim 1, wherein the guide tube comprises means for guiding the assembly preventing the rotation thereof in the guide tube.

3. An apparatus according to claim 2, wherein the guidance means are located at a level such that they only act on the assembly when the latter is disengaged from a lattice in which it is normally immobilized in rotation and wherein the guide tube is directly mounted in rotary manner on a support member.

4. An apparatus according to claim 2, wherein the guidance means are at a level such that they act on the assembly when the latter is still engaged in a lattice in which it is normally immobilized in rotation and wherein the guide tube is mounted in rotary manner on a support member via connection means permitting a swinging movement.

5. An apparatus according to claim 1, wherein the gripping nose has a lower substantially cylindrical portion for penetrating a flange formed at the upper end of a passage issuing at the top of the assembly, a shoulder for bearing on the upper end of the assembly and lugs formed at the lower end of the said substantially cylindrical portion for traversing notches formed in the flange and for engaging therewith, following a rotation of the gripping nose.

6. An apparatus according to claim 1, for the handling of nuclear fuel assemblies within a vessel of a fast neutron nuclear reactor containing a reactor core, said core being sealed by a slab and plugs supporting said apparatus, wherein the lifting means and guide tube gripping means are placed in a recess located in the thickness of one of said plugs, in accordance with the axis of the guide tube and sealed by a tight cover.

7. An apparatus according to claim 1, for the handling of nuclear fuel assemblies within a vessel of a fast neutron reactor containing a reactor core, said vessel being sealed by a slab and plugs supporting said apparatus, wherein the guide tube is supported in rotary manner by a square-shaped rigid structure suspended on the slab by means for orienting the said structure about a second vertical axis displaced with respect to the axis of the guide tube, the lifting means, the gripping means and the orientation means being positioned just above or within a recess located in guide tube thickness of one of said plugs, along the second vertical axis, under a tight cover sealing said recess.

8. An apparatus according to claim 1, for handling nuclear fuel assemblies between at least two stations overhung by a slab having at least one passage to the right of each station, wherein the tube is located in a hod able to move on the slab, so that it is successively placed above each opening, the guide tube being mobile in translation within the hod between an upper transportation position and a lower gripping position, and guide tube gripping means engaging with the guide tube only when the latter is in the lower position.

9. An apparatus according to claim 8, wherein the guide tube has at its upper end at least one row of outer runners bearing on one of two series of guide rails within the hod, the gripping means controlling the rotation of a cylinder placed at the lower end of the hod and having on its inner face a series of guide rails on which bear the said outer runners when the guide tube is in the lower position.

10. An apparatus according to claim 9, wherein it comprises means for alternatively fixing the carriage to the guide tube when the latter is not in the lower position and for fixing the guide tube to the cylinder when the guide tube is in the lower position.

11. An apparatus according to claim 5, for handling a nuclear fuel assembly having an assembly head and wherein a flange provided with notches is formed on the upper end of an axial passage issuing into the upper end of the assembly head.

* * * * *